United States Patent
Tachibana et al.

(10) Patent No.: US 12,443,279 B2
(45) Date of Patent: Oct. 14, 2025

(54) INFORMATION PROCESSING SYSTEM, INFORMATION PROCESSING METHOD, AND INFORMATION PROCESSING PROGRAM

(71) Applicant: NISSIN DENKI KOHSAKU CO., LTD., Osaka (JP)

(72) Inventors: Takaharu Tachibana, Osaka (JP); Kazuhiro Ishibashi, Osaka (JP); Nobuhiro Miyauchi, Osaka (JP)

(73) Assignee: NISSIN DENKI KOHSAKU CO., LTD., Osaka (JP)

( * ) Notice: Subject to any disclaimer, the term of this patent is extended or adjusted under 35 U.S.C. 154(b) by 0 days.

(21) Appl. No.: 18/840,897

(22) PCT Filed: Jan. 30, 2023

(86) PCT No.: PCT/JP2023/002835
§ 371 (c)(1),
(2) Date: Aug. 22, 2024

(87) PCT Pub. No.: WO2023/166893
PCT Pub. Date: Sep. 7, 2023

(65) Prior Publication Data
US 2025/0172995 A1      May 29, 2025

(30) Foreign Application Priority Data
Mar. 1, 2022   (JP) .................................. 2022-030692

(51) Int. Cl.
*G06F 3/01*           (2006.01)
(52) U.S. Cl.
CPC .................................. *G06F 3/013* (2013.01)

(58) Field of Classification Search
None
See application file for complete search history.

(56) References Cited

U.S. PATENT DOCUMENTS

2020/0022577 A1*   1/2020   Rishoni ................. G06F 3/0236

FOREIGN PATENT DOCUMENTS

| JP | S61-243508 A | 10/1986 |
| JP | 2009-054101 A | 3/2009 |

(Continued)

OTHER PUBLICATIONS

International Search Report in PCT/JP2023/002835, Apr. 11, 2023, 5 pages, WIPO.

(Continued)

*Primary Examiner* — Nicholas J Lee
(74) *Attorney, Agent, or Firm* — Modal PLLC

(57) ABSTRACT

An information processing method of recognizing, through use of a computer, input of direction information through eyeball movement of a user and performing processing corresponding to a predetermined GUI element, includes setting a previously acquired eyeball position of the user as a reference eyeball position, setting an eyeball position of the user as an input eyeball position, recognizing the input of the direction information based on a moving direction of an eyeball from the reference eyeball position to the input eyeball position; and performing, based on the recognized input of the direction information, processing corresponding to a second GUI element, which is adjacent to a first GUI element currently in a selected state, and is present in a direction the input of which has been received. The reference eyeball position is dynamically and repeatedly updated based on the acquired eyeball position of the user.

10 Claims, 8 Drawing Sheets

(56) References Cited

FOREIGN PATENT DOCUMENTS

| | | |
|---|---|---|
| JP | 2017-191377 A | 10/2017 |
| JP | 2018-519601 A | 7/2018 |
| JP | 2020-119093 A | 8/2020 |
| WO | 2016142933 A1 | 9/2016 |

OTHER PUBLICATIONS

Written Opinion of the ISA in PCT/JP2023/002835, Apr. 11, 2023, 4 pages, WIPO.
Notice of Reasons for Refusal in counterpart JP2022-030692, Mar. 28, 2024, 14 pages, JPO.

* cited by examiner (A)

(B)

INFORMATION PROCESSING SYSTEM, INFORMATION PROCESSING METHOD, AND INFORMATION PROCESSING PROGRAM

BACKGROUND

Technical Field

The present invention relates to an information processing system for recognizing input of direction information through eyeball movement of a user and performing processing corresponding to a predetermined GUI element, an information processing method therefor, and an information processing program for causing a computer to perform such processing.

Background Art

Hitherto, there has been known an image forming apparatus as described in JP 2020-119093 A provided with a line-of-sight detection function and a display function of displaying a mark indicating a line of sight. In JP 2020-119093 A, the following invention is disclosed:

"An image forming apparatus capable of forming an image on a recording material, the image forming apparatus being characterized by comprising display means capable of displaying information relating to the image forming apparatus, an image pickup unit that picks up an image of a face of a user, and a control unit that detects a line of sight of the user based on an image pickup result obtained by causing the image pickup unit to pick up an image of the face of the user, and characterized in that the control unit causes the display means to display a mark indicating the line of sight of the user based on the detected line of sight of the user."

Further, in JP 2009-54101 A, a line-of-sight input device capable of reducing processing required for calibration and performing line-of-sight input processing with high accuracy is described. Paragraph (0062) of JP 2009-54101 A includes description that "When the coordinates (p, q) of the point at which the input operator M is gazing are located in a predetermined region on the right side of the display 107, it is determined that the input operator M is looking to the right, and when the coordinates (p, q) of the point at which the input operator M is gazing are located in a predetermined region on the left side of the display 107, it is determined that the input operator M is looking to the left."

However, when a computer such as a portable electronic terminal, a personal computer, an image forming apparatus, or a stationary game machine recognizes a point of gaze at which a user is actually looking and displays a pointer or the like indicating the point of gaze on a display unit, the following problems have arisen.

In a line-of-sight recognition technology for recognizing the point of gaze, there has been difficulty in accurately recognizing the point of gaze due to various factors such as changes in relative positions of a computer and a user (up, down, left, or right and a distance between the computer and the user), changes in orientation of the face of the user, and difficulty in precisely detecting the point at which the user is actually gazing. In this regard, when there is a deviation between the real point of gaze of the user and the point of gaze detected by the computer, a pointer or the like indicating the point of gaze is displayed at a position deviated from the real point of gaze of the user. In this case, when a computer or the like is operated through the line of sight of the user, the pointer or the like displayed at the position deviated from the line of sight of the user moves so as to follow a motion of the real point of gaze of the user, and hence there has occurred a problem that operation is extremely difficult.

Further, such a deviation between the real point of gaze and the point of gaze detected by the computer continues to remain until calibration is performed, and hence it has been extremely inconvenient to operate a computer or the like that uses the line-of-sight recognition technology.

In particular, factors that cause the deviation, such as the changes in relative positions of the computer and the user (up, down, left, or right and the distance between the computer and the user) and the changes in orientation of the face of the user, are caused by movements of the user, cannot be completely eliminated, and thus have been particularly difficult issues to solve in the line-of-sight recognition technology.

BRIEF SUMMARY

Therefore, the present invention has an object to provide an information processing system, an information processing method, and an information processing program that enable operation of a GUI element without being concerned about a deviation of a point of gaze.

Thus, as means for solving the above-mentioned issues, according to one embodiment of the present invention, there is provided an information processing system that recognizes, through use of a computer, input of direction information through eyeball movement of a user and performs processing corresponding to a predetermined GUI element, the information processing system including: input recognition means for setting a previously acquired eyeball position of the user as a reference eyeball position serving as a reference, setting an eyeball position of the user acquired after the acquisition of the reference eyeball position as an input eyeball position, and recognizing the input of the direction information based on a moving direction of an eyeball from the reference eyeball position to the input eyeball position; and GUI processing means for performing, based on the recognized input of the direction information, processing corresponding to a second GUI element, which is adjacent to a first GUI element initially in a selected state, and is present in a direction the input of which has been received, wherein the reference eyeball position is dynamically and repeatedly updated based on the acquired eyeball position of the user.

Further, the input recognition means may be configured to iteratively repeat processing for recognizing the input of the direction information based on the moving direction of the eyeball from the reference eyeball position to the input eyeball position.

Further, the information processing system may further include eyeball position acquisition means for iteratively acquiring the eyeball position of the user, and may be configured to perform: update processing for dynamically and repeatedly updating the reference eyeball position so that the eyeball position at a time point a predetermined time period before a current time point becomes the reference eyeball position; detection processing for detecting the moving direction of the eyeball from the reference eyeball position to the input eyeball position; and recognition processing for recognizing the detected moving direction as the input of the direction information.

Further, the input recognition means may be configured to recognize the input of the direction information when a movement amount exhibited in movement of the eyeball from the reference eyeball position to the input eyeball position is equal to or larger than a predetermined threshold value.

Further, the predetermined threshold value may be set based on a degree of variation in eyeball position due to involuntary eye movement during fixation of the user.

Further, the GUI processing means may be configured to perform the processing corresponding to the second GUI element after a lapse of a predetermined time period since the recognition of the input of the direction information performed by the input recognition means, the information processing system may further include time display means for displaying, in an area in which the second GUI element is displayed, a time remaining until the processing corresponding to the second GUI element is performed, and the predetermined threshold value may be set so as to prevent the input of the direction information from being recognized based on the movement of the eyeball from the eyeball position exhibited when the user visually recognizes the second GUI element to the eyeball position exhibited when the user visually recognizes the time displayed in the area in which the second GUI element is displayed.

Further, the processing corresponding to the predetermined element may be transition from the selected state of the first GUI element to a selected state of the second GUI element, and the information processing system may be configured to confirm, when a predetermined time has elapsed since turning of the second GUI element to the selected state, the selection of the second GUI element when no transition from the selected state of the second GUI element to a selected state of another GUI element occurs.

Further, the processing corresponding to the predetermined GUI element may be transition from the selected state of the first GUI element to a selected state of the second GUI element, and the information processing system may be configured to confirm the selection of the second GUI element when no input of the direction information has been recognized for a predetermined time period since turning of the second GUI element to the selected state.

Further, the predetermined GUI elements may be arrayed within three rows and three columns along at least one of a row direction or a column direction.

Further, the information processing system may be configured to avoid recognizing both a point of gaze of the user and a GUI element at which the user is gazing.

Further, as means for solving the above-mentioned issues, according to one embodiment of the present invention, there is provided an: information processing method of recognizing, through use of a computer, input of direction information through eyeball movement of a user and performing processing corresponding to a predetermined GUI element, the information processing method including: an input recognition step of setting a previously acquired eyeball position of the user as a reference eyeball position serving as a reference, setting an eyeball position of the user acquired after the acquisition of the reference eyeball position as an input eyeball position, and recognizing the input of the direction information based on a moving direction of an eyeball from the reference eyeball position to the input eyeball position; and a GUI processing step of performing, based on the recognized input of the direction information, processing corresponding to a second GUI element, which is adjacent to a first GUI element currently in a selected state, and is present in a direction the input of which has been received, wherein the reference eyeball position is dynamically and repeatedly updated based on the acquired eyeball position of the user.

Further, as means for solving the above-mentioned issues, according to one embodiment of the present invention, there is provided an information processing program for causing a computer to recognize input of direction information through eyeball movement of a user and execute processing corresponding to a predetermined GUI element, the information processing program causing the computer to execute: input recognition processing for setting a previously acquired eyeball position of the user as a reference eyeball position serving as a reference, setting an eyeball position of the user acquired after the acquisition of the reference eyeball position as an input eyeball position, and recognizing the input of the direction information based on a moving direction of an eyeball from the reference eyeball position to the input eyeball position; GUI processing for performing, based on the recognized input of the direction information, processing corresponding to a second GUI element, which is adjacent to a first GUI element currently in a selected state, and is present in a direction the input of which has been received; and update processing for dynamically and repeatedly updating the reference eyeball position based on the acquired eyeball position of the user.

According to the present invention, the information processing system, the information processing method, and the information processing program that enable operation of the GUI element without being concerned about the deviation of the point of gaze can be provided.

BRIEF DESCRIPTION OF DRAWINGS

FIG. 1 are schematic conceptual views of an information processing system for illustrating an example in an embodiment, in which FIG. 1(A) is a view for illustrating an example of a scene in which a user (U) uses the information processing system according to this embodiment, and FIG. 1(B) is a view for illustrating a concept of input of direction information in the information processing system according to this embodiment.

FIG. 6 are screen views of GUI processing of the information processing system for illustrating an example in the embodiment, in which FIG. 6(A) is a view for illustrating an example of processing for GUI elements displayed along a row direction and a column direction, FIG. 6(B) is a view for illustrating an example of processing for GUI elements displayed along the column direction, and FIG. 6(C) is a view for illustrating an example of processing for a keyboard (K) serving as GUI elements displayed along the row direction and the column direction.

DETAILED DESCRIPTION

Now, embodiments of the present invention are described in detail with reference to the accompanying drawings.

Components having substantially the same functions and configurations are denoted by the same reference symbols herein and the drawings, and an overlapping description thereof is omitted.

Further, all the matters described in this embodiment are merely examples of the embodiment of the present invention, and the technical scope of the present invention is not limited thereto. The term "system" as used in this embodiment is not limited to one implemented through use of one computer, and also includes one implemented through use of a plurality of computers that perform information communication to/from each other. An information processing system, an information processing method, an information processing program, and an information processing device that are described in this embodiment can all be changed, as appropriate, in terms of aspects of distribution and centralization thereof, and are not limited to those described in this embodiment.

In this embodiment, an example in which the information processing system is implemented by one information processing device 1 is described. However, the information processing system may be implemented by, for example, a so-called client-server system in which a plurality of information processing devices communicate to/from each other to perform specific information processing in cooperation with each other.

Outline of Embodiment

Figure 1:
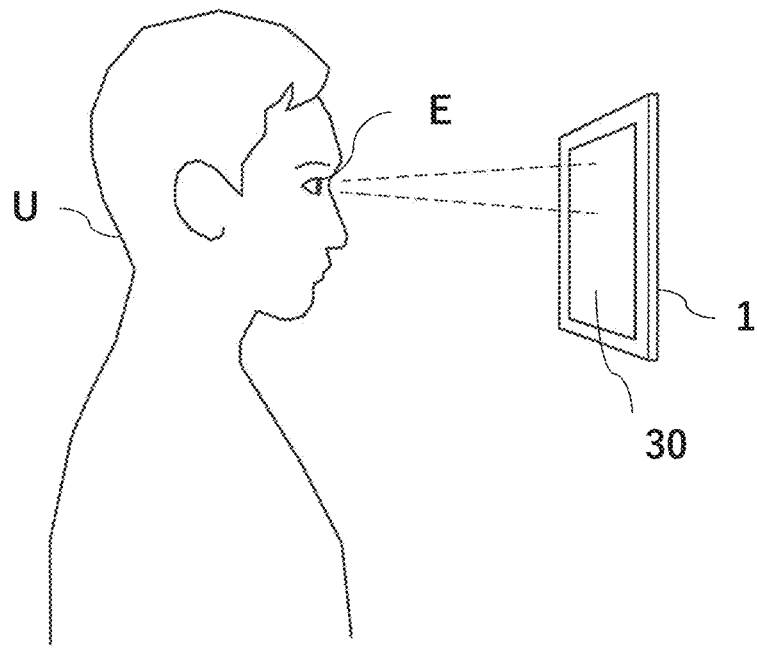
Figure 1:
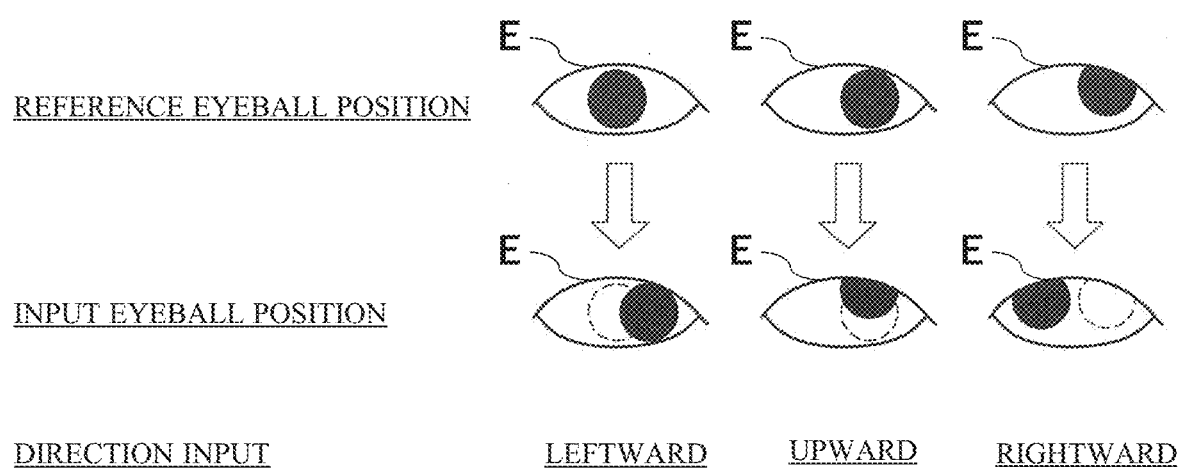

FIG. 1 are schematic conceptual views of an information processing system for illustrating an example in this embodiment. As an example, as illustrated in FIG. 1(A), when a user U uses the information processing device 1, the information processing system can recognize input of direction information through eyeball movement of the user U. The information processing system performs processing corresponding to a predetermined GUI element through the input of direction information recognized by the information processing device 1.

The GUI element is a display element displayed on a display unit 30, and relates to selection processing, execution processing, and other information processing. The GUI element may be simply turned to a selected state in response to the input of the direction information, may cause predetermined information processing to be performed in response to the input of the direction information, or may cause predetermined information processing to be performed while being turned to a selected state in response to the input of the direction information. That is, any one of various display elements can be adopted as the GUI element as long as the display element enables predetermined processing such the selection processing or the execution processing to be executed with the input of the direction information being used as a trigger. In the following, examples of the GUI element are given. Examples that can be assumed as the GUI element that is simply turned to a selected state in response to the input of the direction information include a plurality of selectable icons, cards, character elements, illustrations, and other elements that are arranged, a list such as radio buttons, checkboxes, and a drop-down list, and a keyboard. Further, examples that can be assumed as the GUI element that causes predetermined information processing to be performed in response to the input of the direction information include a GUI element that causes display of the next photo in a slide show of photos or the like and a GUI element that causes display of the next page on a page of an electronic book. Further, examples that can be assumed as the GUI element that causes predetermined information processing to be performed while being turned to a selected state in response to the input of the direction information include a GUI element that causes content to be selected from a playlist of music tracks or videos and also causes playback processing or the like to be performed.

Further, an eyeball position is a central part of a pupil in an eyeball of the user U. Further, the normal direction of the center of the eyeball and the eyeball position serves as the line-of-sight direction of the user U. An eyeball position α can be represented by, for example, an eyeball coordinate system $(r, \theta, \varphi)$ expressed by a radial coordinate "r" that is a distance from the center of the eyeball, an angular coordinate θ formed by a vertical z-axis and a radius vector, and an angular coordinate φ formed by an x-axis, which is another axis in a plane perpendicular to the z-axis, and a projection of the radius vector onto the plane. Here, the distance from the center of the eyeball to the central part of the pupil is always constant, and hence the radial coordinate "r" may be omitted to set $\alpha=(\theta, \varphi)$.

Further, the eyeball position may also be represented by coordinates projected onto an XY-plane of an image acquired by image pickup means such as a camera. In this case, the eyeball position may be represented by an image coordinate system (x, y) expressed with any point on an eye E as the origin, or may be represented by an image coordinate system (r, δ) expressed with any point on the eye E as the origin by the radial coordinate "r" that is a distance from the origin to the eyeball position α and an angular coordinate d formed by a predetermined axis "x" passing through the origin and the radius vector. That is, the eyeball position may be represented by an eyeball coordinate system defined on the physical eyeball itself, or may be represented by an image coordinate system defined on an image or the like including the eyeball, as long as such a coordinate system specifies the position of the central part of the pupil of the user U, which indicates the line-of-sight direction of the user U.

As illustrated in FIG. 1(A), the user U who uses the information processing device 1 sets the information processing device 1 at a position that allows the eyeball position of the user U to be recognized. It is preferred to set the information processing device 1 at, as the position that allows the eyeball position of the user U to be recognized, a position at which a face of the user U is opposed to the information processing device 1 in front thereof. However, in regard to positions of the face of the user U and the information processing device 1, the face of the user U and the information processing device 1 may have a diagonal positional relationship as long as the eyeball position of the user U can be acquired by the information processing device 1.

In FIG. 1(A), a tablet-type terminal is illustrated as the information processing device 1. However, the information processing device that implements the information processing system is not limited thereto. For example, the information processing system can be implemented through use of various computers including a smartphone, a future phone, a laptop personal computer, a desktop personal computer, a television set, a monitor, a printing machine, a game machine, a ticket vending machine, an ATM, a wearable device such as eyeglasses with an information processing function, or operation panels of various devices.

FIG. 1(B) is a conceptual view for illustrating the input of the direction information through the eyeball movement described in this embodiment. In vertical arrangement, the left-end column of eyeballs represents input of leftward direction information, the middle column of eyeballs represents input of upward direction information, and the right-end column of eyeballs represents input of rightward direction information.

In horizontal arrangement, the first row indicates a reference eyeball position, the second row indicates an input eyeball position, and the third row indicates the direction information input by direction input. Here, the reference eyeball position represents a previously acquired eyeball position of the user U, and the input eyeball position represents the eyeball position of the user U acquired after the acquisition of the reference eyeball position.

As illustrated in the left-end column of eyeballs of FIG. 1(B), as the input of the direction information through the eyeball movement, it is recognized that the input of the leftward direction information has occurred when the eyeball has moved to the left from the reference eyeball position serving as a reference (i.e., to the right as viewed from the information processing device 1, with the information processing device 1 opposed to the face of user U serving as the reference). Similarly, as illustrated in the middle column of eyeballs of FIG. 1(B), as the input of the direction information through the eyeball movement, it is recognized that the input of the upward direction information has occurred when the eyeball has moved upward from the reference eyeball position (i.e., upward as viewed from the information processing device 1, with the information processing device 1 opposed to the face of user U serving as the reference). Also similarly, as illustrated in the right-end column of eyeballs of FIG. 1(B), as the input of the direction information through the eyeball movement, it is recognized that the input of the rightward direction information has occurred when the eyeball has moved to the right from the reference eyeball position (i.e., to the left as viewed from the information processing device 1, with the information processing device 1 opposed to the face of user U serving as the reference).

That is, the input of the direction information in this embodiment is ascribable to the moving direction of the eyeball. Specifically, the previously acquired eyeball position of the user U is set as the reference eyeball position serving as a reference, the eyeball position of the user U acquired after the acquisition of the reference eyeball position is set as the input eyeball position, and the input of the direction information is recognized based on the moving direction of the eyeball from the reference eyeball position to the input eyeball position.

FIG. 1(B) is also an illustration of how the eyeball position changes in the following order: the top left end, the bottom left end, the top middle, the bottom middle, the top right end, and the bottom right end.

Then, the reference eyeball position is dynamically and repeatedly updated based on the acquired eyeball position of the user U. For example, the reference eyeball position in the top middle of FIG. 1(B) is a reference eyeball position updated based on the input eyeball position in the bottom left end, which is the previously acquired eyeball position of the user U. Further, for example, the reference eyeball position in the top right end of FIG. 1(B) is a reference eyeball position updated based on the input eyeball position in the bottom middle, which is the previously acquired eyeball position of the user U. The reference eyeball position is not always required to be obtained by updating the eyeball position so that the eyeball position previously used as the input eyeball position becomes the reference eyeball position. For example, the reference eyeball position may be set based on a predetermined rule such as setting the reference eyeball position to an eyeball position at a frame a predetermined number of frames before a frame at a time point of recognizing the input of the direction information among eyeball positions repeatedly acquired at a predetermined frame rate or setting the reference eyeball position to an eyeball position at a time point a predetermined time period before the time point of recognizing the input of the direction information.

The information processing device 1 also performs, based on the recognized input of the direction information, processing corresponding to a second GUI element, which is adjacent to a first GUI element currently in a selected state, and is present in the direction the input of which has been received. As such GUI elements and GUI processing, various modes described later can be adopted.

Further, distinction between the first GUI element and the second GUI element is for convenience of description. The GUI element initially in a selected state is set as the first GUI element, and the GUI element adjacent thereto and present in the direction the input of which has been received is set as the second GUI element.

The first GUI element initially in a selected state serves as a starting point for identifying the second GUI element to be processed by GUI processing means 160. In other words, the starting point for identifying the second GUI element is the first GUI element initially in a selected state. As the first GUI element serving as such a starting point, a GUI element that is currently in a selected state when the input of the direction information is received may be adopted, or a GUI element that was in a selected state at a predetermined time point in the past may be adopted.

That is, when the GUI element currently in a selected state is adopted as the first GUI element, the GUI element currently in a selected state may differ depending on a timing of performing the GUI processing, and it is possible to appropriately change the starting point for identifying the second GUI element from among a plurality of GUI elements displayed on the display unit 30.

Meanwhile, when the GUI element that was in a selected state at a predetermined point in the past is adopted as the first GUI element, it is possible to perform processing corresponding to the second GUI element from a consistent starting point without changing the starting point for identifying the second GUI element depending on the timing of performing the GUI processing.

With the information processing system according to this embodiment based on the above-mentioned technical spirit, it is possible to operate a GUI element without being concerned about a deviation of a point of gaze.

That is, the user U moves each of his or her eyeballs, as appropriate, in order to visually recognize a GUI element displayed on the display unit 30 of the information processing device 1 or the like. In parallel therewith, the information processing device 1 acquires the eyeball position of the user U as the reference eyeball position, and dynamically updates this reference eyeball position. Then, the information processing device 1 recognizes the input of the direction information based on the moving direction of the eyeball position from the dynamically updated reference eyeball position to the input eyeball position acquired after the acquisition of the reference eyeball position. Then, in accordance with v the recognized direction information, the information processing device 1 performs the processing corresponding to the second GUI element, which is adjacent to the first GUI element initially in a selected state, and is present in the direction the input of which has been received.

Thus, the processing corresponding to the second GUI element, which is present adjacently to the first GUI element in a selected state, is executed through the movement of the eyeball performed in order to visually recognize a GUI element displayed on the display unit 30. This allows the user U to operate a GUI element without being concerned about a deviation of the point of gaze.

With the information processing system according to this embodiment, the information processing device 1 is not required to recognize the point of gaze, which is a point on a screen at which the user U is gazing, or the GUI element at which the user U is gazing. That is, the information processing system according to this embodiment recognizes the direction of movement of the eyeball position from the dynamically updated reference eyeball position as the input of the direction information, and hence the information processing device 1 is not required to recognize the point of gaze of the user U.

Accordingly, it is possible to overcome such a problem with the related-art method that operability of line-of-sight input deteriorates due to a deviation between the point of gaze at which the user U is gazing in reality and the point of gaze calculated by the information processing device 1 through calculation, the deviation being caused by, for example, changes in the relative positions of the user U and the information processing device 1.

Now, an example of the information processing device 1 that implements the information processing system according to this embodiment is specifically described.

(Hardware Configuration of Information Processing Device 1 According to Embodiment)

Figure 2:
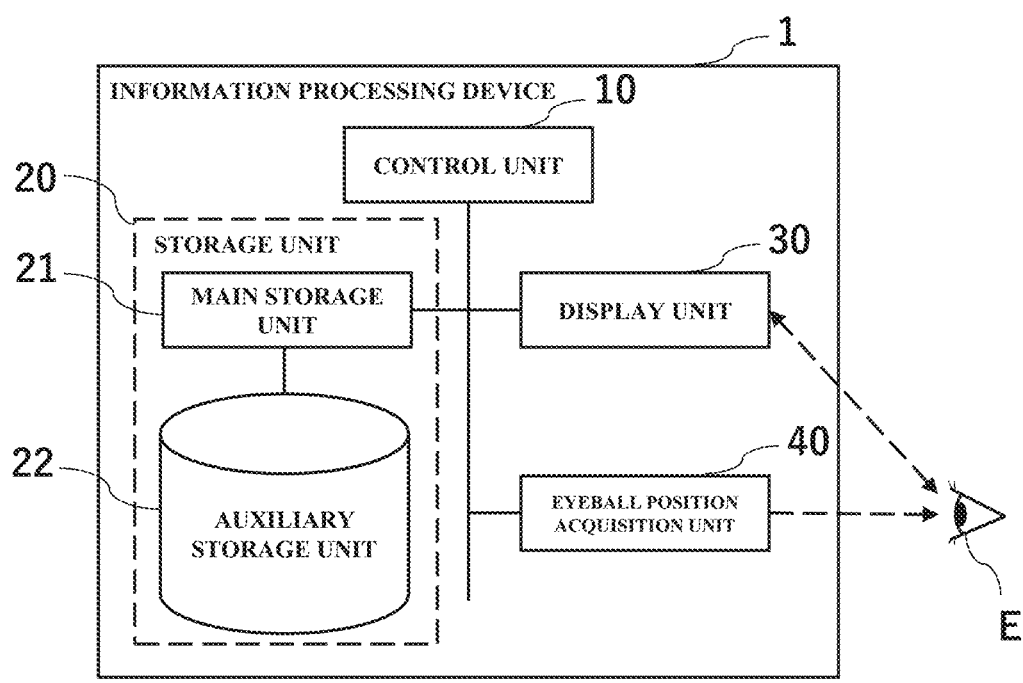
FIG. 2 is a hardware configuration diagram of the information processing system for illustrating an example in the embodiment.

FIG. 2 is a hardware configuration diagram of the information processing device 1 for illustrating an example in the embodiment.

In the following, an example of a hardware configuration of the information processing device 1 that implements the information processing system according to this embodiment is described.

As illustrated in FIG. 2, as an example, the information processing device 1 includes a control unit 10, a main storage unit 21 and an auxiliary storage unit 22 that form a storage unit 20, the display unit 30, and an eyeball position acquisition unit 40. The information processing device 1 according to this embodiment forms an information processing system unique to this embodiment by causing the control unit 10, the storage unit 20, the display unit 30, and the eyeball position acquisition unit 40 to cooperate with each other.

The control unit 10 can be formed of, for example, one or a plurality of processor units such as central processing units (CPUs), micro processor units (MPUs), or graphics processing units (GPUs) or a combination thereof. The control unit 10 reads out a program stored in the auxiliary storage unit 22 and cooperates with the storage unit 20 to perform various types of arithmetic operation processing such as information processing or control processing.

The main storage unit 21 can be formed of, for example, a temporary storage area such as a static random access memory (SRAM), a dynamic random access memory (DRAM), a cache memory, or a flash memory or a combination thereof. The main storage unit 21 temporarily stores data required for the control unit 10 to perform various types of arithmetic operation processing.

The auxiliary storage unit 22 can be formed of, for example, a non-volatile storage area such as a hard disk drive (HDD) or a solid state drive (SSD) or a combination thereof. The auxiliary storage unit 22 stores programs and data required for the control unit 10 to execute processing and other programs and data.

The display unit 30 can be formed of, for example, display means 130 such as a liquid crystal display, an organic electroluminescence display, or another type of display, a touch panel, or a projector or a combination thereof. Predetermined information is displayed on the display unit 30 through processing of the control unit 10. In particular, GUI elements to be visually recognized by the user U are displayed on the display unit 30.

The eyeball position acquisition unit 40 can be formed of, for example: image pickup means such as a camera, an infrared camera, or an ultraviolet camera, or another sensor, which is attached to the information processing device 1; a sensor or the like included in a wearable device such as eyeglasses with an information processing function, which is attached near the eyeball of the user U, and acquires the eyeball position; a sensor, which is attached to a body of the user U, and measures a myoelectric potential near the eyeball of the user U; or a combination thereof. The eyeball position acquisition unit 40 acquires the eyeball position or the like of the user U to be required for the control unit 10 to perform the processing. The eyeball position acquisition unit 40 may be a sensor or the like that acquires the eyeball position through use of a separate hardware element, or may be a combination of a camera or the like that picks up an image including the eyeball and a program for calculating the eyeball position, which is executed by the control unit 10.

In this embodiment, the eyeball position acquisition unit 40 is formed by combining the camera and the program for calculating the eyeball position, but the eyeball position acquisition unit 40 may also be a sensor, which is physically independent of the information processing device 1, and is attached to the body of the user U.

(Functions of Information Processing Device 1 According to Embodiment and Relationships Therebetween)

Figure 3:
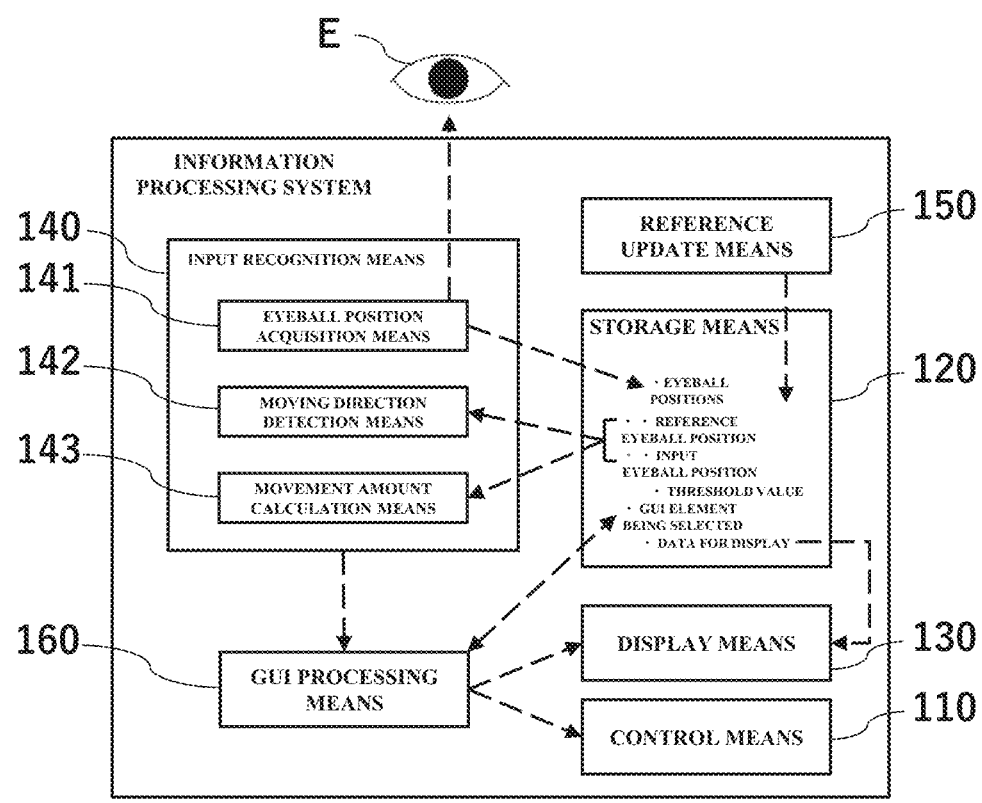
FIG. 3 is a functional relationship diagram of the information processing system for illustrating an example in the embodiment.

FIG. 3 is a functional relationship diagram of an example of the information processing device 1 that implements the information processing system according to this embodiment. Each functional element illustrated therein by being represented as means is implemented by hardware elements of the information processing device 1 cooperating with each other.

Specifically, in the information processing system, various hardware elements of the information processing device 1 form control means 110, the display means 130, storage means 120, input recognition means 140, reference update means 150, and the GUI processing means 160.

The control means 110 is formed of, for example, the control unit 10, and a control program and other programs that are read out from the auxiliary storage unit 22. The control means 110 performs various types of arithmetic operation processing such as information processing or control processing in the information processing device 1 according to this embodiment.

The display means 130 is formed of, for example, the display unit 30, the control unit 10, and a program and data for display that are read out from the auxiliary storage unit 22. In this embodiment, the display means 130 displays a plurality of GUI elements. It is preferred that predetermined discrimination means be provided for the GUI element currently in a selected state so that the user U can grasp the GUI element being selected. Examples of such discrimination means that can be adopted includes means for making a brightness or color difference from other GUI elements, means for displaying a predetermined mark indicative of being selected, or means for surrounding the GUI element being selected with a frame.

The storage means 120 is formed of, for example, the main storage unit 21, the auxiliary storage unit 22, and the control unit 10 that controls those units. In this embodiment, the storage means 120 stores eyeball positions including the reference eyeball position and the input eyeball position, a threshold value, the GUI element being selected, and the data for display.

Now, each piece of information stored in the storage means 120 is described.

The eyeball position is information on the eyeball position acquired by eyeball position acquisition means 141. As described above, the eyeball position is stored as coordinate information based on a camera coordinate system.

The reference eyeball position is the eyeball position at a predetermined time point, and is the previously acquired eyeball position of the user U relative to the time point of recognizing the input of the direction information. The reference eyeball position is dynamically and repeatedly updated based on the acquired eyeball position of the user U.

The input eyeball position is the eyeball position of the user U acquired after the acquisition of the reference eyeball position.

The threshold value is a value to be used for determining whether or not to perform the input of the direction information and to be compared to a movement amount of the eyeball position. The threshold value may be updated, as appropriate, by the processing of the information processing device 1, or may be a value set in advance.

The GUI element being selected is information indicating the GUI element currently being selected among the GUI elements displayed on the display unit 30. When the GUI element being selected is updated, the information indicated by the GUI element being selected is also updated.

The data for display is content data for a screen displayed on the display unit 30.

The input recognition means 140 is preferred to include, for example, the eyeball position acquisition means 141, moving direction detection means 142, and movement amount calculation means 143. The input recognition means 140 is formed of, for example, the eyeball position acquisition unit 40, the control unit 10, and a program that is read out from the auxiliary storage unit 22. The input recognition means 140 performs acquisition of the eyeball position of the user U and detection of the moving direction of the eyeball through use of the eyeball position acquisition means 141 and the moving direction detection means 142, to thereby recognize the input of the direction information performed by the user U, and transmits a processing command for performing the GUI processing to the GUI processing means 160.

In this embodiment, the movement amount calculation means 143 is included as an example, to thereby enable suitable recognition of the input of the direction information using the movement amount of the movement of the eyeball of the user U.

The eyeball position acquisition means 141 is formed of, for example, the eyeball position acquisition unit 40. The eyeball position acquisition means 141 acquires the eyeball position of the user U visually recognizing the display unit 30. Then, the eyeball position acquisition means 141 acquires the eyeball position of the user U, and stores the acquired eyeball position in the storage means 120.

Further, the eyeball position acquisition means 141 is preferred to iteratively acquire the eyeball position of the user U. In particular, the eyeball position acquisition means 141 is preferred to repeatedly acquire the eyeball position for each predetermined number of frames.

In this embodiment, the eyeball position acquired by the eyeball position acquisition means 141 is represented by an image coordinate system defined in an XY-plane image onto which the eyeball is projected. However, for example, the eyeball position may be represented by an eyeball coordinate system defined on the physical eyeball itself of the user U, which is acquired by a sensor or the like attached near the eyeball.

The eyeball position acquired by the eyeball position acquisition means 141 is stored in the main storage unit 21 or the auxiliary storage unit 22 by the storage means 120. Then, a predetermined eyeball position is set as the reference eyeball position by the program executed by the control unit 10 or the like. After that, the eyeball position of the user U acquired by the eyeball position acquisition means 141 after the acquisition of the reference eyeball position is set as the input eyeball position by the program executed by the control unit 10 or the like.

The moving direction detection means 142 is formed of, for example, the control unit 10 and the main storage unit 21. The moving direction detection means 142 reads out the reference eyeball position and the input eyeball position that have been stored by the storage means 120, and detects the moving direction of the eyeball from the reference eyeball position to the input eyeball position. In a case of detecting the moving direction, for example, coordinates of the reference eyeball position and coordinates of the input eyeball position are compared to each other, to thereby be able to detect the moving direction. As an example, in this embodiment, the moving direction of the eyeball is detected in four directions of up, down, left, and right.

Further, in response to acquisition of a new eyeball position, the moving direction detection means 142 may set the new eyeball position as the input eyeball position directly without storing the new eyeball position in the storage unit 20 and compare the new eyeball position to the previously acquired reference eyeball position, to thereby detect the moving direction of the eyeball.

The moving direction is not limited to the four directions of up, down, left, and right, and may be detected in, for example, eight directions obtained by adding upper right, lower right, upper left, and lower left to the four directions of up, down, left, and right, or may be detected in more directions. In the same manner, fewer moving directions, such as two directions of up and down or left and right may be detected. Such moving directions are preferred to be set in relation to arrangement of the GUI elements displayed on the display unit 30.

The movement amount calculation means 143 is formed of, for example, the control unit 10 and the main storage unit 21. The movement amount calculation means 143 calculates a movement amount exhibited in movement of the eyeball from the reference eyeball position to the input eyeball position, and determines whether or not the movement amount is equal to or larger than a predetermined threshold value stored in the main storage unit 21. Then, when the movement amount exhibited in the movement of the eyeball from the reference eyeball position to the input eyeball position is equal to or larger than the predetermined threshold value, the movement amount calculation means 143 recognizes the input of the direction information, and transmits the processing command for performing the GUI processing to the GUI processing means 160.

Even when the information processing system does not include the threshold value and the movement amount calculation means 143, the moving direction detection means 142 can detect the moving direction of the eyeball from the reference eyeball position to the input eyeball position, recognize the detected moving direction as the input of the direction information through the eyeball movement of the user U, and transmit the processing command for performing the GUI processing to the GUI processing means 160, to thereby enable the information processing system according to this embodiment to function.

The reference update means 150 is formed of, for example, the control unit 10 and the storage unit 20. The reference update means 150 dynamically and repeatedly updates the reference eyeball position stored in the main storage unit 21 or the auxiliary storage unit 22 based on the acquired eyeball position of the user U. In this embodiment, the eyeball position acquisition means 141 iteratively acquires the eyeball position of the user U, and the reference update means 150 dynamically and repeatedly updates the reference eyeball position accordingly.

The reference update means 150 may allocate in advance an area for storing the reference eyeball position in the storage unit 20 and dynamically and repeatedly update the area, or may dynamically and repeatedly update the reference eyeball position by reading out the eyeball position previously acquired at a time of detecting the direction of the eyeball movement.

The GUI processing means 160 is formed of, for example, the control unit 10 and the storage unit 20. When the processing command for performing the GUI processing, which includes the recognized direction information, is received from the input recognition means 140, the GUI processing means 160 performs, based on the recognized input of the direction information, the processing corresponding to the second GUI element, which is adjacent to the first GUI element currently in a selected state, and is present in the direction the input of which has been received.

As such GUI processing, for example, various types of information processing such as selection processing for a predetermined GUI element, execution processing therefor, and execution processing therefor performed together with selection thereof can be assumed. Specific examples thereof that can be assumed include processing for selecting, based on the input of the direction information, the second GUI element, which is adjacent to the first GUI element in a selected state, and is present in the direction the input of which has been received, execution processing for executing, based on the input of the direction information, the second GUI element, which is adjacent to the first GUI element in a selected state, and is present in the direction the input of which has been received, and processing for selecting, based on the input of the direction information, the second GUI element, which is adjacent to the first GUI element in a selected state, and is present in the direction the input of which has been received, and also performing the predetermined information processing. That is, the GUI processing includes various types of processing, which require the direction information, and are generally performed as information processing through input of a direction key of a computer, flick of a touch panel, or the like. To give examples of the GUI processing, examples that can be assumed as the selection processing to be performed based on the input of the direction information include selection of the predetermined GUI element such as a plurality of selectable icons, cards, character elements, illustrations, and other elements that are arranged, a list such as radio buttons, checkboxes, and a drop-down list, and a keyboard. Further, examples that can be assumed as the execution processing to be performed based on the input of the direction information include display processing for the next photo in a slide show of photos or the like and display processing for the next page on a page of an electronic book. Further, examples that can be assumed as the predetermined information processing to be performed together with the selection processing based on the input of the direction information include playback processing or the like to be performed together with selection processing for content from a playlist of music tracks or videos. Further, under a state in which the second GUI element, which is adjacent to the first GUI element, and is present in the direction the input of which has been received, is not displayed on the display unit 30, processing for displaying the second GUI element by switching the screen through scrolling or the like and for selecting the second GUI element may be performed.

(Processing Flow of Information Processing Device 1 According to Embodiment)

Figure 4:
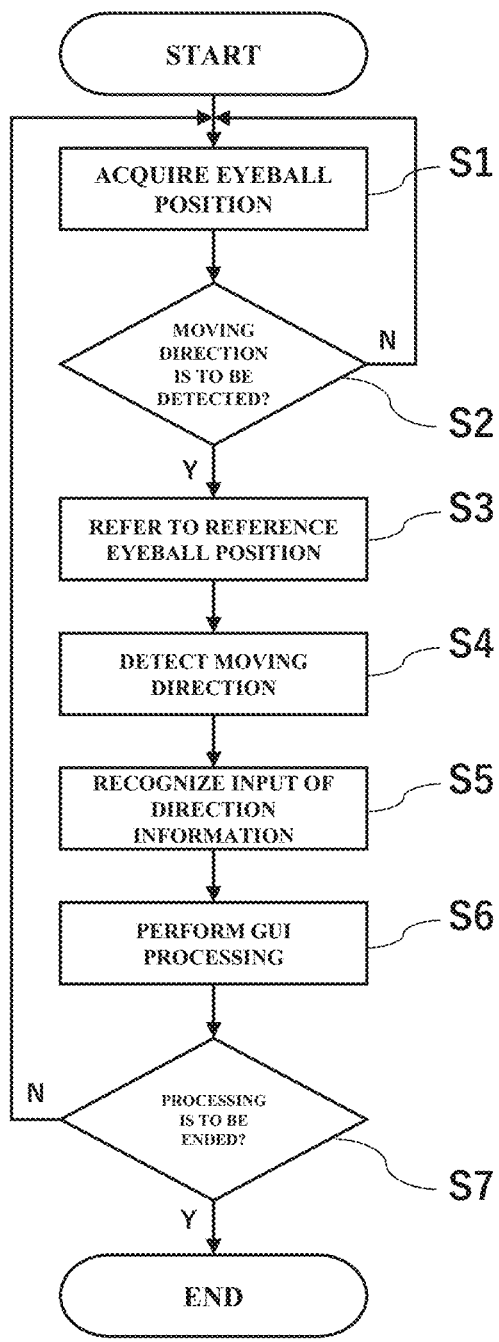
FIG. 4 is a flow chart of the information processing system for illustrating an example in the embodiment.

Next, processing flow of the information processing system according to this embodiment is described with reference to FIG. 4. FIG. 4 is a flow chart of the information processing system for illustrating an example in the embodiment.

Step S1 of acquiring the eyeball position is a step of acquiring, by the eyeball position acquisition means 141, the eyeball position of the user U. In Step S1 of acquiring the eyeball position, the eyeball position acquisition unit 40 such as a camera provided to the information processing device 1 picks up an image including the eyeball, and acquires the coordinates of the eyeball position from the image. The coordinates of the eyeball position are stored in the main storage unit 21 or the auxiliary storage unit 22 by the storage means 120.

In Step S2 of determining whether or not the moving direction is required to be detected, it is determined whether or not the moving direction is required to be detected. In Step S2 of determining whether or not the moving direction is required to be detected, when it is determined that the moving direction is required to be detected, the process advances to Step S3 of referring to the reference eyeball position, and when it is determined that the moving direction is not required to be detected, the process returns to Step S1 of acquiring the eyeball position. As an example of such a case, there is a case in which, as illustrated in, for example, FIG. 5, the eyeball position is acquired at a predetermined frame rate to detect the moving direction of the eyeball for each predetermined number of frames.

Step S2 of determining whether or not the moving direction is required to be detected can also be formed, for example, through use of a counter or the like. That is, in Step S2 of determining whether or not the moving direction is required to be detected, the counter is incremented by the number of times that it was determined that the moving direction is not required to be detected, and when the counter reaches a predetermined number, it can be determined that the moving direction is required to be detected.

In Step S3 of referring to the reference eyeball position, the reference eyeball position stored in the main storage unit 21 or the auxiliary storage unit 22 is referred to.

At a time of referring to the reference eyeball position, it is preferred to reserve an area in a cache or memory for storing the reference eyeball position, update the reference eyeball position at a regular interval, and read out the reference eyeball position from the storage area at a timing at which the reference eyeball position is referred to.

However, in a case of referring to the reference eyeball position, the reference eyeball position may be dynamically and repeatedly updated by storing in advance a plurality of eyeball positions acquired over a predetermined time period in the storage unit 20 and, at the timing at which the reference eyeball position is referred to, acquiring, from the storage unit 20, the eyeball position at a time a certain time period before or the eyeball position at a frame a predetermined number of frames before.

As the reference eyeball position to be referred to, for example, it is preferred to refer to the reference eyeball position at a time 0.1 second to 0.4 second before the acquisition of the input eyeball position. However, the time at which the reference eyeball position is acquired is not limited thereto.

As an example, at a frame rate of 60 fps at which the eyeball position is acquired 60 times per second, the eyeball position at a time 15 frames before, which corresponds to a time 0.25 second before an acquisition time point of the input eyeball position, is read out as the reference eyeball position. Thus, each time the input eyeball position is acquired and the moving direction is detected, the reference eyeball position is updated to that at the time 15 frames before, to thereby enable suitable detection of the moving direction of the eyeball.

In Step S4 of detecting the moving direction, the eyeball position of the user U acquired after the acquisition of the eyeball position serving as the reference eyeball position is set as the input eyeball position, and the moving direction of the eyeball from the reference eyeball position to the input eyeball position is detected. For example, it is preferred that the input eyeball position be the currently or most recently acquired eyeball position of the user U.

As an example, in this embodiment, the currently or most recently acquired eyeball position of the user U is set as the input eyeball position, and the eyeball position at a frame a predetermined number of frames before a frame at the acquisition time point of the input eyeball position is set as the reference eyeball position. Then, the set reference eyeball position and the set input eyeball position are compared to each other, to thereby detect the moving direction of the eyeball from the reference eyeball position to the input eyeball position.

Figure 5:
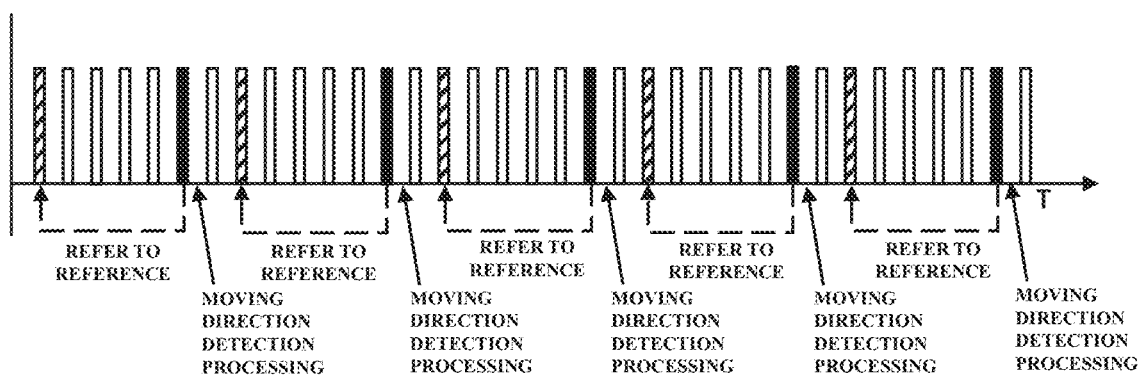
FIG. 5 is a schematic diagram of frame processing of the information processing system for illustrating an example in the embodiment.

As an example, a flow of frame processing is described with reference to FIG. 5. FIG. 5 is a schematic diagram of the frame processing of the information processing system for illustrating an example in the embodiment.

In FIG. 5, a time T elapses toward the right. Pulses rising side by side in a horizontal direction represent timings of the processing for acquiring, by the eyeball position acquisition means 141, the eyeball position at a predetermined frame rate. The pulses filled in black each represent the eyeball position acquired by the eyeball position acquisition means 141 to serve as the input eyeball position. The hatched pulses each represent the eyeball position at a stage five frames before that of the input eyeball position, which is referred to in Step S3 of referring to the reference eyeball position to serve as the reference eyeball position.

In a step of detecting the moving direction, for example, the input eyeball position is acquired at a predetermined interval, and the eyeball position at a time point of a frame a predetermined number of frames before that of the input eyeball position is referred to, to thereby dynamically and repeatedly update the reference eyeball position. Then, the moving direction can be detected based on the moving direction of the eyeball from the updated reference eyeball position to the input eyeball position.

Further, for example, processing for acquiring the input eyeball position is repeated at a predetermined interval, to thereby enable the input of the direction information and the GUI processing to be repeatedly performed while dynamically and repeatedly updating the input eyeball position and the reference eyeball position.

In Step S5 of recognizing the input of the direction information, the input of the direction information performed by the user U is recognized based on the moving direction of the eyeball detected in Step S4 of detecting the moving direction.

In Step S5 of recognizing the input of the direction information, the input of the direction information can be recognized based on the moving direction of the eyeball relating to a difference between the coordinates of the reference eyeball position and the coordinates of the input eyeball position.

As an example, in a case of recognizing the input of the direction information, it is preferred to acquire the movement amount of the eyeball from the reference eyeball position to the input eyeball position and recognize the input of the direction information when the movement amount is equal to or larger than a predetermined threshold value stored in the storage unit 20. That is, the acquired eyeball position value may slightly change depending on, for example, recognition accuracy of the eyeball position, a relative positional relationship between the face of the user U and the information processing device 1, or involuntary eye movement during fixation of the eyeball of the user U. The input of the direction information is recognized when the movement amount exhibited in the movement of the eyeball from the reference eyeball position to the input eyeball position is equal to or larger than the predetermined threshold value, and hence it is possible to prevent the input of the direction information from being recognized due to those changes in eyeball position by which the input of the direction information is not intended.

Further, as an example, the threshold value is preferred to be set based on a degree of variation in eyeball position due to the involuntary eye movement during fixation of the user U. That is, when the threshold value is set based on the degree of variation in eyeball position due to the involuntary eye movement during fixation of the user U, the movement amount exhibited in the movement of the eyeball due to the involuntary eye movement during fixation falls below the threshold value, and hence the input of the direction information is not recognized by the involuntary eye movement during fixation of the user U. Therefore, the direction information can be recognized only in a case of conscious movement of the eyeball of the user U, thereby making a direction information input operation more convenient.

In this case, the threshold value may be set in advance to a certain value. A standard deviation of the movement amount of the eyeball in the involuntary eye movement during fixation of the user U may be calculated based on data on a plurality of eyeball positions previously acquired from the user U, and the threshold value may be set based on the standard deviation so as to prevent the input of the direction information from being recognized by part of the involuntary eye movement during fixation. For such setting of the threshold value based on the standard deviation, for example, a method of calculating a confidence interval in production management or the like can be used. Assuming that the standard deviation is $\sigma$, when "average value+$\sigma$" is set as the threshold value, about 68.3% of the involuntary eye movement during fixation is not to be recognized as the input of the direction information, and when "average value+2σ" is set as the threshold value, about 95.4% of the involuntary eye movement during fixation is not to be recognized as the input of the direction information.

In Step S6 of performing the GUI processing, the processing corresponding to the second GUI element, which is adjacent to the first GUI element currently in a selected state, and is present in the direction the input of which has been received, is performed based on the input of the direction information recognized in Step S5 of recognizing the input of the direction information.

As the GUI processing, as described above, for example, various types of information processing such as selection processing for a predetermined GUI element, execution processing therefor, and execution processing therefor performed together with selection thereof can be assumed.

Figure 6:
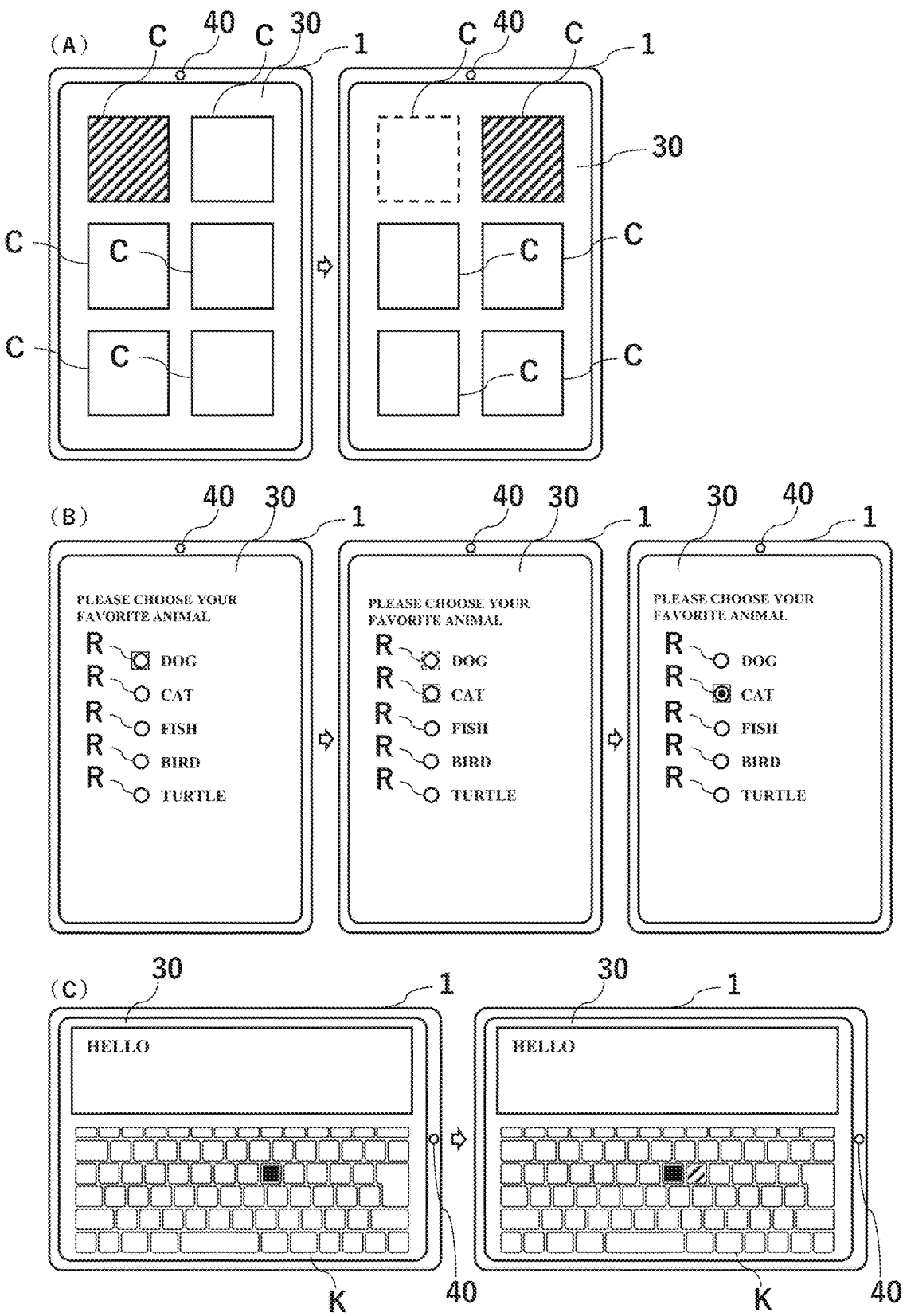

NOW, representative examples of the selection processing for the predetermined GUI element among types of GUI processing are described with reference to FIG. 6. FIG. 6 are screen views of the GUI processing of the information processing system for illustrating an example in the embodiment.

FIG. 6(A) is a view in which cards C are arranged in three rows and two columns on the screen as selectable GUI elements. The hatched card C is the first GUI element currently in a selected state. In this case, in the information processing device 1 on the left side, the upper left card C is the first GUI element in a selected state. Then, when the input of the direction information of the rightward direction is recognized, as in the information processing device 1 on the right side, the GUI processing means 160 selects the upper right card C, which is adjacent to the upper left card C indicated by the broken line, and is present on the right side, as the second GUI element. Then, in the view of the information processing device 1 on the right side, the upper right card C is newly currently in a selected state, and hence the upper right card C is handled as the first GUI element. Such a plurality of GUI elements arranged in the vertical and horizontal directions are preferred to be laid out within three rows and three columns. That is, with the layout within three rows and three columns, the selected state can be moved from one end to the other end in a left-right direction or from one end to the other end in an up-down direction by recognizing the input of the direction information two or less times, thereby making operation performed by the user U simple. Further, the directions relating to such recognition of the input of the direction information are not limited to four directions as viewed from the GUI element in a selected state in the vertical direction and the horizontal direction, and, for example, the input of the direction information such as diagonal directions may be recognized.

FIG. 6(B) is a view in which five radio buttons R are arranged vertically on the screen as selectable GUI elements. The radio button R surrounded by the solid-line rectangle is the first GUI element currently in a selected state. In this case, in the information processing device 1 on the left side, the topmost radio button R for "DOG" is the first GUI element in a selected state. Then, when the input of the direction information of the downward direction is recognized, as in the information processing device 1 in the middle, the GUI processing means 160 selects the radio button R for "CAT," which is adjacent to the radio button R for "DOG" surrounded by the broken line, and is present therebelow, as the second GUI element. Then, in the view of the information processing device 1 in the middle, the radio button R for "CAT" is newly currently in a selected state, and hence the radio button R for "CAT" is handled as the first GUI element. Further, in a case of the radio buttons R being used as the GUI elements, it is required to perform confirmation processing for the GUI element in a selected state. As the confirmation processing, for example, when the user U has gazed at the radio button R for "CAT" for a predetermined time period and no input of the direction information has thereby been recognized for the predetermined time period, the confirmation processing can be performed to display a bullet (·) on the radio button R for "CAT" as in the information processing device 1 on the left side. As another type of confirmation processing, when a predetermined time period has elapsed since the radio button R for "CAT," which had been the second GUI element, was turned to a selected state, a bullet can be displayed on the radio button R for "CAT" when no transition from the selected state of the radio button R for "CAT" to the selected state of another GUI element occurs. In addition thereto, for example, conscious eye closure that can be distinguished from blinking can be handled as the confirmation processing.

FIG. 6(C) is a view in which a keyboard K is arranged on the screen as selectable GUI elements. In the information processing device 1, a key filled in black is the first GUI element currently in a selected state. In this case, in the information processing device 1 on the left side, a key for "I" is the first GUI element in a selected state. Then, when the input of the direction information of the leftward direction is recognized, as in the information processing device 1 on the right side, the GUI processing means 160 selects a key for "U", which is adjacent to the hatched key for "I", and is present on the left side thereof, as the second GUI element. Then, in the view of the information processing device 1 on the left side, the key for "U" is newly currently in a selected state, and hence the key for "U" is handled as the first GUI element. Further, in a case of the keyboard K, it is preferred to perform confirmation processing for key input in the same manner as in the case of the radio buttons R of FIG. 6(B), which has already been described.

As has already been mentioned, the GUI processing is not limited to the representative selection processing described herein, and includes various other types of information processing.

In Step S7 of determining whether or not to end the processing, it is determined whether or not to end the processing such as the processing for recognizing the input of the direction information and the GUI processing is to be ended. As a case in which it is determined that the processing is to be ended, for example, a case in which the input of the direction information and the GUI processing in this embodiment have been completed is assumed, and specifically, termination of an application using the invention according to this embodiment or other such case can be assumed. Meanwhile, as a case in which it is determined that the processing is not to be ended, for example, a case in which the input of the direction information and the GUI processing in this embodiment are to be further continued is assumed, and specifically, a case in which the application using the invention according to this embodiment is to be continuously used or other such case can be assumed.

For example, when the flow of FIG. 4 is looped a plurality of times to continuously determine that the processing is not to be ended, the input recognition means 140 repeats the processing for recognizing the input of the direction information based on the moving direction of the eyeball from the reference eyeball position to the input eyeball position. In addition, in this case, the reference eyeball position and the input eyeball position are dynamically and repeatedly updated.

Thus, when the GUI processing is, for example, processing involving selection, the selection processing corresponding to the second GUI element, which is adjacent to the first GUI element currently in a selected state, and is present in the direction the input of which has been received, is performed, to thereby turn the second GUI element to a selected state, and in the next loop processing, the GUI element that was the second GUI element is handled as the first GUI element currently in a selected state. Therefore, the second GUI elements to be sequentially selected are each handled as the first GUI element in the next loop, to thereby enable a plurality of GUI elements displayed on the display unit 30 to be selected in such a manner that the plurality of GUI elements are scanned.

Meanwhile, when the GUI processing is, for example, processing that does not involve the selection processing, the processing corresponding to the second GUI element, which is adjacent to the first GUI element currently in a selected state, and is present in the direction the input of which has been received, is performed, and in the next loop processing, the same GUI element is handled as the first GUI element again. Therefore, the GUI processing that matches the input direction information can be performed on one or a plurality of GUI elements that are present adjacently to the first GUI element, and it is also possible to perform the same GUI processing a plurality of times by inputting information of the same direction a plurality of times, as desired.

(Actions and Functions of Information Processing Device 1 in Embodiment)

The information processing system according to this embodiment includes: the input recognition means 140 for setting a previously acquired eyeball position of the user U as a reference eyeball position serving as a reference, setting an eyeball position of the user U acquired after the acquisition of the reference eyeball position as an input eyeball position, and recognizing the input of the direction information based on a moving direction of an eyeball from the t reference eyeball position to the input eyeball position; and the GUI processing means 160 for performing, based on the recognized input of the direction information, processing corresponding to a second GUI element, which is adjacent to a first GUI element currently in a selected state, and is present in a direction the input of which has been received. Further, the reference eyeball position is dynamically and repeatedly updated based on the acquired eyeball position of the user U.

Therefore, as the user U moves the eyeball, as appropriate, to visually recognize the GUI elements displayed on the display unit 30, it is possible to recognize the input of the direction information through the movement of the eyeball position of the user U and perform the GUI processing. More specifically, in parallel with the movement of the eyeball position of the user U, the information processing system acquires the eyeball position of the user U as the reference eyeball position, and dynamically updates the acquired reference eyeball position. Then, the information processing system detects the movement of the eyeball position from the dynamically updated reference eyeball position to the input eyeball position acquired after the acquisition of the reference eyeball position, and recognizes the input of the direction information based on the moving direction of the eyeball position. Then, in accordance with the recognized direction information, the information processing device 1 performs the processing corresponding to the second GUI element, which is adjacent to the first GUI element currently in a selected state, and is present in the direction the input of which has been received.

Thus, the processing corresponding to the second GUI element, which is present adjacently to the first GUI element in a selected state, is executed through the movement of the eyeball performed in order to visually recognize a GUI element displayed on the display unit 30. This allows the user U to operate a GUI element without being concerned about a deviation of the point of gaze.

Further, the input of the direction information is recognized based on the repeatedly updated reference eyeball position, and hence it is possible to provide an information processing system in which, compared to a related-art scheme that constantly recognizes the point of gaze and displays a pointer on a screen, influences of a deviation between relative positions of the face and the computer, changes in orientation of the face of the user U, and the like are suppressed, and calibration processing between the real point of gaze of the user U and the point of gaze recognized by the computer is not required, thereby enabling the input of the direction information through the movement of the eyeball position with high input accuracy.

The input recognition means 140 of the information processing system according to this embodiment may iteratively repeat the processing for recognizing the input of the direction information based on the moving direction of the eyeball from the reference eyeball position to the input eyeball position.

In this case, when the GUI processing is, for example, processing involving selection, the selection processing corresponding to the second GUI element, which is adjacent to the first GUI element currently in a selected state, and is present in the direction the input of which has been received, is performed, to thereby turn the second GUI element to a selected state, and then, when the processing for recognizing the input of the direction information is repeatedly performed, the GUI element that was the second GUI element is handled as the first GUI element currently in a selected state. Therefore, the second GUI elements to be sequentially selected are each handled as the first GUI element in the next loop, to thereby enable a plurality of GUI elements displayed on the display unit 30 to be selected in such a manner that the plurality of GUI elements are scanned.

Meanwhile, when the GUI processing is, for example, processing that does not involve the selection processing, the processing corresponding to the second GUI element, which is adjacent to the first GUI element currently in a selected state, and is present in the direction the input of which has been received, is performed, and in the next loop processing, the same GUI element is handled as the first GUI element again. Therefore, the GUI processing that matches the input direction information can be performed on one or a plurality of GUI elements that are present adjacently to the first GUI element, and it is also possible to perform the same GUI processing a plurality of times by inputting information of the same direction a plurality of times, as desired.

Accordingly, after the processing corresponding to the second GUI element present adjacently to the first GUI element currently in a selected state is executed, it is possible to iteratively perform further additional input of the direction information and the GUI processing corresponding to the input direction information. Therefore, it is possible to provide an information processing system that is more practical for the user U.

In the information processing system according to this embodiment, the input recognition means 140 may recognize the input of the direction information when a movement amount exhibited in movement of the eyeball from the reference eyeball position to the input eyeball position is equal to or larger than a predetermined threshold value.

In this case, the threshold value is appropriately set, to thereby be able to prevent the input of the direction information from being recognized when a distance of the movement of the eyeball position from the reference eyeball position to the input eyeball position is small, as desired.

Therefore, for example, when the threshold value is set based on the degree of variation in eyeball position due to the involuntary eye movement during fixation of the user U, it is possible to suppress erroneous recognition of the input of the direction information due to the involuntary eye movement during fixation of the user U. Further, for example, when the GUI elements displayed on the screen are large in size, the threshold value can be set large, and when the GUI elements are small in size, the threshold value can be set small. In this case, it is possible to suppress a case in which, even though the user U continues to visually recognize a predetermined GUI element, the processing corresponding to a GUI element adjacent thereto is adversely performed based on erroneous recognition that there has been input of the direction information due to slight movement of the point of gaze.

In the information processing system according to this embodiment, the processing corresponding to the GUI element may be transition from the selected state of the first GUI element to the selected state of the second GUI element, and, when a predetermined time has elapsed since turning of the second GUI element to the selected state, the selection of the second GUI element may be confirmed when no transition from the selected state of the second GUI element to a selected state of another GUI element occurs.

Further, in the information processing system according to this embodiment, the processing corresponding to the GUI element may be transition from the selected state of the first GUI element to the selected state of the second GUI element, and the selection of the second GUI element may be confirmed when no input of the direction information has been recognized for a predetermined time period since turning of the second GUI element to the selected state.

In those cases, a predetermined time interval occurs after the second GUI element is selected until the selection of the second GUI element is confirmed.

Therefore, even when a predetermined GUI element is turned to a selected state due to erroneous recognition of the input of the direction information, it is possible to return to the selected state of an original GUI element by moving the eyeball position toward the direction of the original GUI element without executing the predetermined GUI element that has been turned to a selected state due to the erroneous recognition.

In the information processing system according to this embodiment, the GUI elements may be arrayed within three rows and three columns along at least one of the row direction or the column direction.

In this case, the selected state can be moved from one end to the other end in the left-right direction or from one end to the other end in the up-down direction by inputting the direction information two or less times, thereby making operation performed by the user U simple.

The information processing system according to this embodiment may avoid recognizing both the point of gaze of the user U and a GUI element at which the user U is gazing.

That is, the information processing system according to this embodiment recognizes the input of the direction information based on the movement of the eyeball position from the reference eyeball position to the input eyeball position, and therefore enables the computer to be operated without recognizing the point of gaze of the user U or the GUI element at which the user U is gazing.

Further, when designed to avoid recognizing both the point of gaze of the user U and the GUI element at which the user U is gazing, the information processing system can be simply configured, and it is also possible to prevent a situation in which any one of the point of gaze of the user U and the GUI element at which the user U is gazing causes a deviation from a recognition result obtained by the computer.

The reference eyeball position can be dynamically and repeatedly updated so that the reference eyeball position to be used at a timing of detecting direction information becomes the eyeball position at a time point a certain time period before a time point at which the input eyeball position was acquired.

In this case, an interval between a timing of acquiring the reference eyeball position to be used for detecting the direction information and a timing of acquiring the input eyeball position becomes always constant.

This enables the input of the direction information to be performed through the movement of the eyeball position more comfortably by the user U who has become accustomed to the interval between the timing of acquiring the reference eyeball position and the timing of acquiring the input eyeball position.

Further, the interval from the time point of acquiring the reference eyeball position to the time point of acquiring the input eyeball position is preferably one second or less, and more preferably, from 0.1 second to 0.4 second.

When the interval from the reference eyeball position to the time of acquiring the input eyeball position is about such a length, the interval matches a speed at which a human eyeball moves, and it is more reliable to suitably detect the movement of the eyeball position with the reference eyeball position being set to the eyeball position at a start time point of the movement of the eyeball position and the input eyeball position being set to the eyeball position at an end time point of the movement of the eyeball position.

It is also preferred to provide the information processing system with blink detection means. For example, as such blink detection means, image recognition or the like may be performed on an image picked up by the eyeball position acquisition unit 40 to detect a blink, or a blink may be detected from a value of the eyeball position acquired in Step S1 of acquiring the eyeball position. The value of the eyeball position acquired simultaneously with a blink often indicates a significantly larger value than that of a normal movement amount of the eyeball position. For that reason, a predetermined threshold value for blink detection is set, and when the eyeball movement amount is calculated to exceed the threshold value, an abnormal value due to a blink is considered to have occurred, to thereby be able to prevent the input of the direction information from being recognized.

Another Embodiment

Next, as another embodiment, an example of a conversation support system using the information processing device 1 that implements the information processing system, which has already been described, is described. Components that have already been described are denoted by the same reference symbols, thereby omitting description thereof.

The conversation support system in the another embodiment described as an example conveys an intention of the user U to a person with whom the user U wishes to have a conversation by, in accordance with a GUI element selected by the user U, outputting a voice corresponding to the GUI element.

For example, in diseases such as amyotrophic lateral sclerosis (ALS) and muscular dystrophy, eyeball movement is often possible even when speech becomes difficult. Therefore, use of the conversation support system in the another embodiment described as an example enables the intention of the user U to be conveyed to the person with whom the user U wishes to have a conversation even when speech is difficult.

As an example, the information processing device 1 includes the control unit 10, the main storage unit 21 and the auxiliary storage unit 22 that form the storage unit 20, the display unit 30, the eyeball position acquisition unit 40, and a voice output unit. The information processing device 1 according to this embodiment forms a conversation support system unique to the another embodiment by causing the control unit 10, the storage unit 20, the display unit 30, the eyeball position acquisition unit 40, and the voice output unit to cooperate with each other.

The voice output unit can be formed of, for example, a voice output device such as a built-in or external speaker, earphones, or headphones or a combination thereof. As the voice output unit, it is possible to adopt any type of mode that allows the person with whom the user U wishes to have a conversation to recognize a voice. For example, the information processing device 1 that emits a sound may be adopted, and it is possible to adopt each type of mode such as a mode of transmitting a signal to earphones or the like used by the person with whom the user U wishes to have a conversation to command the wireless earphones to emit a sound. The voice output unit outputs the voice corresponding to the GUI element selected by the user U using the information processing device 1, to thereby allow the person with whom the user U wishes to have a conversation to recognize the voice.

The information processing device 1 that implements the conversation support system in the another embodiment described as an example includes, as functional units thereof, the control means 110, the display means 130, the storage means 120, the input recognition means 140, the reference update means 150, the GUI processing means 160, and time display means.

The storage means 120 stores the eyeball positions including the reference eyeball position and the input eyeball position, the threshold value, the GUI element being selected, and the data for display.

Figure 8:
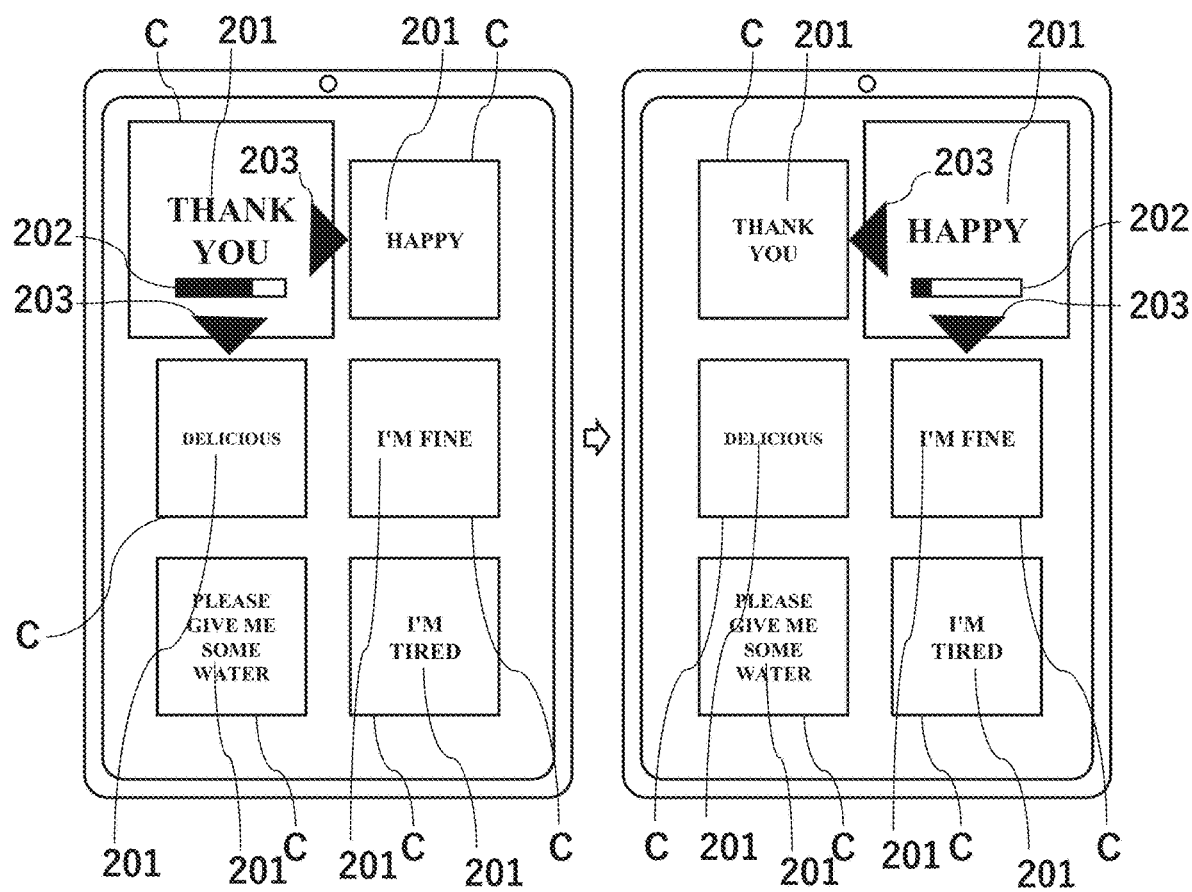
FIG. 8 is a screen view of for illustrating a screen of the conversation support system for illustrating an example in the another embodiment.

As the data for display in the another embodiment described as an example, content data for displaying the cards C on the screen is adopted as illustrated in FIG. 8. That is, in the another embodiment described as an example, the cards C displayed on the display unit 30 are adopted as the GUI elements. In the another embodiment described as an example, it is preferred that a message element 201 such as characters, an illustration, an icon, a symbol, or a graphic form corresponding to content to be output by the voice output unit be displayed in a display area for one card C in a one-to-one correspondence. The storage means 120 stores voice data to be output by the voice output unit in correspondence with each message element 201 of the data for display.

Further, in the another embodiment described as an example, a value of the threshold value is appropriately set in accordance with a size of the display area for each card C illustrated in FIG. 8, to thereby be able to reduce the erroneous recognition of the input of the direction information. That is, the threshold value is set small when a terminal having a relatively small screen, such as a smartphone, is adopted as the information processing device 1, thereby reducing the display area being an area in which one card C is displayed, while the threshold value is set large when a terminal having a relatively large screen, such as a tablet terminal, a laptop personal computer, or a desktop personal computer, is adopted as the information processing device 1, thereby increasing the display area for the card C. The size of such a display area for the card C also changes depending on the number of cards C to be displayed, which can be appropriately set, and hence the threshold value may be set according to the number of cards C to be displayed.

Further, the threshold value is preferred to be set so as to prevent the input of the direction information from being recognized based on the movement amount of the eyeball position from the eyeball position exhibited when the user U visually recognizes a predetermined card C being the second GUI element to the eyeball position exhibited when the user U visually recognizes a time displayed in the display area for that card C. To that end, the threshold value is set, for example, larger than the movement amount of the eyeball position from the eyeball position exhibited when the user U visually recognizes the predetermined card C being the second GUI element to the eyeball position exhibited when the user U visually recognizes the time displayed in the display area for that card C. Specifically, for example, it is preferred to prevent the input of the direction information from being recognized based on the movement amount of the eyeball position from a center of the card C or a position of the message element 201 at which the user U is gazing to a position of an indicator 202 indicating the time or the like.

It is preferred to prevent the input recognition means 140 from recognizing the input of the direction information based on the movement of the eyeball from the eyeball position exhibited when the user U visually recognizes the card C being the second GUI element to the eyeball position exhibited when the user U visually recognizes the time displayed in the area in which the second GUI element is displayed.

The GUI processing means 160 receives the processing command for performing the GUI processing, which includes the recognized direction information, from the input recognition means 140, to thereby perform, based on the recognized input of the direction information, the processing corresponding to another card C being the second GUI element, which is adjacent to the predetermined card C being the first GUI element currently in a selected state, and is present in the direction the input of which has been received.

In this case, in particular, the selection processing for the card C is performed, and a timer running until the selection of the card C is confirmed is also started by displaying a time remaining until the selection of the card C is confirmed in the display area for the card C that has been turned to a selected state. Then, when the timer has expired to confirm the selection of the card C, the voice corresponding to the message element 201 included in that card C is output from the voice output unit.

The time display means is formed, for example, by combining the control unit 10 and the storage unit 20. When the predetermined card C is turned to a selected state based on the recognition of the input of the direction information, the time display means displays the time remaining until the selection of the card C is confirmed in the display area for the card C. As the time displayed in the display area for the card C, the time can be displayed in various modes. For example, the time remaining until the selection of the card C is confirmed may be displayed by counting down numbers, or may be displayed by counting up numbers, or the time may also be displayed by decreasing or increasing a predetermined indicator 202 as illustrated in FIG. 8.

Figure 7:
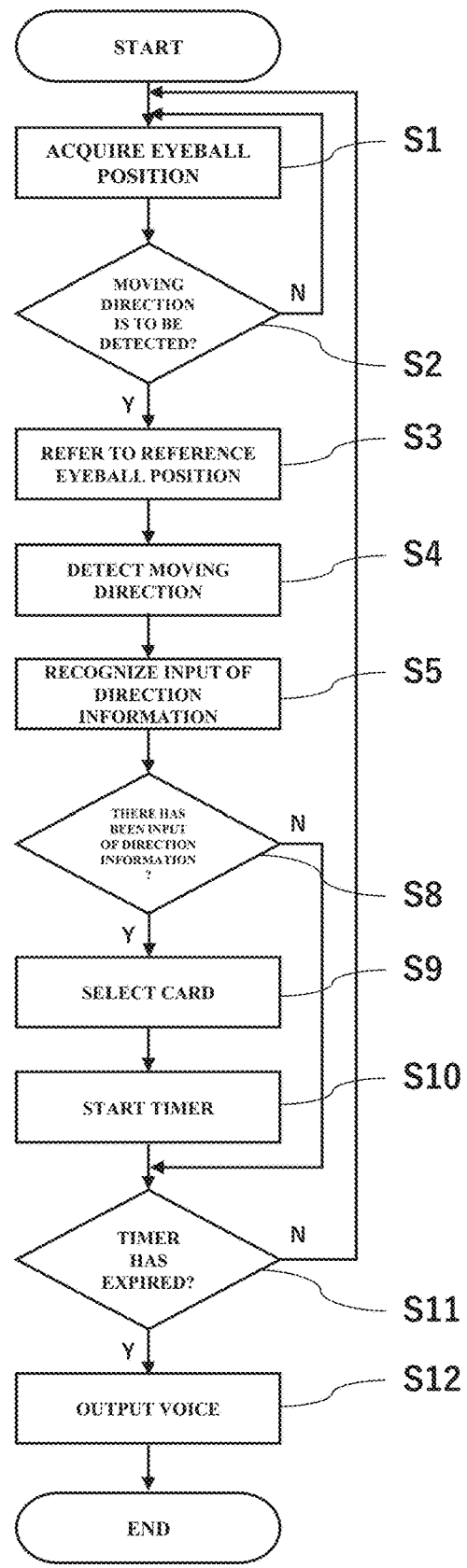
FIG. 7 is a flow chart of a conversation support system for illustrating an example in another embodiment.

Next, a processing flow in the another embodiment described as an example is described with reference to FIG. 7.

In the conversation support system in the another embodiment, Step S1 of acquiring the eyeball position, Step of determining whether or not the moving direction is required to be detected, Step S3 of referring to the reference eyeball position, Step S4 of detecting the moving direction, and Step S5 of recognizing the input of the direction information are formed in the same manner as in the processing that has already been described. Therefore, steps unique to the another embodiment are particularly described below.

In Step S8 of determining whether or not there has been input of the direction information, it is determined whether or not there has been input of the direction information. In a case of determining whether or not there has been input of the direction information, it is determined that there has been input of the direction information when the movement amount of the eyeball from the reference eyeball position to the input eyeball position is equal to or larger than a predetermined threshold value. Meanwhile, it is determined that there has been no input of the direction information when the movement amount of the eyeball falls below the predetermined threshold value. In Step S8 of determining whether or not there has been input of the direction information, when it is determined that there has been input of the direction information, the process subsequently advances to Step S9 of selecting the card, and when it is determined that there has been no input of the direction information, the process skips to Step S11 of determining whether or not the timer has expired.

In Step S9 of selecting the card, the card C, which is adjacent to the card C currently in a selected state, and is present in the direction the input of which has been received, is selected based on the direction information recognized in Step S5 of recognizing the input of the direction information. It is also preferred that predetermined discrimination means be provided for the GUI element so that the user U can easily recognize the GUI element such as the card C that has been turned to a selected state. As an example of such discrimination means, the card C currently in a selected state may be displayed larger than the surrounding cards C as illustrated in FIG. 8, or the GUI element being selected may be surrounded by a circular frame, a rectangular frame, or another type of frame.

As illustrated in FIG. 8, a direction indicating element 203 for indicating a direction to the card C that can be selected next by inputting the direction information may be displayed on the card C currently in a selected state. In this case, after the card C is selected in Step S9 of selecting the card, when further selection of a different card C is intended, it is easier to recognize in which direction the eyeball is to be moved.

In Step S10 of starting the timer, in response to the card C being turned to a selected state in Step S9 of selecting the card, the timer that measures the time remaining until the selection of the card C currently in a selected state is confirmed. In addition, in conjunction therewith, the time display means displays a predetermined display element that indicates the time, such as the indicator 202, in the display area for the card C being selected so that the user U can recognize the time remaining until the selection of the card C is confirmed.

In Step S11 of determining whether or not the timer has expired, it is determined whether or not the timer started in Step S10 of starting the timer has expired, that is, whether or not the selection of the card C is ready to be confirmed. In Step S11 of determining whether or not the timer has expired, when the timer has expired, the process subsequently advances to Step S12 of outputting the voice, and when the timer has not expired, the process returns to Step S1 of acquiring the eyeball position.

More specifically, when the timer has expired, the voice corresponding to the message element 201 of the card C the selection of which has been confirmed is output for conversation support. Meanwhile, when the timer has not expired, the process returns to the acquisition of the eyeball position, the movement of the eyeball position is newly detected, and the recognition of the input of the direction information as to whether or not the user U is to select a different card C is repeated. In this case, the loop processing is performed, to thereby allow the user U to input the direction information again to select a different card C before the timer expires when the user U mistakenly selects a card C or when the user U wishes to further select another card C.

In Step S12 of outputting the voice, the voice output unit outputs the voice corresponding to the message element 201 of the card C the selection of which has been confirmed. Accordingly, the voice corresponding to the card C that reflects the intention of the user U is transmitted to the person with whom the user U wishes to have a conversation, to thereby enable the intention of the user U to be conveyed thereto without having a verbal conversation.

The configuration and the processing flow of the information processing system or conversation support system according to each embodiment described above are given as an example of the embodiment. The information processing system according to this embodiment can be implemented by various hardware elements and processing flows, as desired, as long as the input of the direction information is recognized based on the moving direction of the eyeball from the reference eyeball position, which is dynamically and repeatedly updated, to the input eyeball position acquired after the acquisition of the reference eyeball position to perform, based on the input of the direction information, the processing corresponding to the second GUI element, which is adjacent to the first GUI element currently in a selected state, and is present in the direction the input of which has been received. Further, the information processing system according to this embodiment does not require all pieces of information to be input through the movement of the eyeball position. Therefore, in addition to the input of the direction information based on the movement of the eyeball position, it may be possible to perform processing by input means such as a mouse, a keyboard, or a touch panel.

Although exemplary embodiments of the information processing system have been described above, the technical scope of the present invention is not limited to the disclosure of such embodiments.

REFERENCE SIGNS LIST 1 information processing device
10 control unit
20 storage unit
21 main storage unit 22 auxiliary storage unit
30 display unit
40 eyeball position acquisition unit
110 control means
120 storage means
130 display means
140 input recognition means
141 eyeball position acquisition means
142 moving direction detection means
143 movement amount calculation means
150 reference update means
160 GUI processing means
201 message element
202 indicator
203 direction indicating element
C card
R radio button
K keyboard
U user
E eye

The invention claimed is:

1. An information processing system that recognizes, through use of a computer, input of direction information through eyeball movement of a user and performs processing corresponding to a predetermined GUI element, the information processing system comprising:
input recognition means for setting a previously acquired eyeball position of the user as a reference eyeball position serving as a reference, setting an eyeball position of the user acquired after the acquisition of the reference eyeball position as an input eyeball position, and recognizing the input of the direction information based on a moving direction of an eyeball from the reference eyeball position to the input eyeball position;
GUI processing means for performing, based on the recognized input of the direction information, processing corresponding to a second GUI element, which is adjacent to a first GUI element initially in a selected state, and is present in a direction the input of which has been received; and
reference update means for dynamically and repeatedly updating the reference eyeball position based on the acquired eyeball position of the user,
wherein the processing corresponding to the predetermined GUI element comprises transition from the selected state of the first GUI element to a selected state of the second GUI element, and
wherein the information processing system is configured to confirm, when a predetermined time has elapsed since turning of the second GUI element to the selected state, the selection of the second GUI element when no transition from the selected state of the second GUI element to a selected state of another GUI element occurs.

2. The information processing system according to claim 1, wherein the input recognition means is configured to iteratively repeat processing for recognizing the input of the direction information based on the moving direction of the eyeball from the reference eyeball position to the input eyeball position.

3. The information processing system according to claim 1, further comprising
eyeball position acquisition means for iteratively acquiring the eyeball position of the user,
wherein the information processing system is configured to perform:
update processing for dynamically and repeatedly updating the reference eyeball position so that the eyeball position at a time point a predetermined time period before a current time point becomes the reference eyeball position;
detection processing for detecting the moving direction of the eyeball from the reference eyeball position to the input eyeball position; and
recognition processing for recognizing the detected moving direction as the input of the direction information.

4. The information processing system according to claim 1, wherein the input recognition means is configured to recognize the input of the direction information when a movement amount exhibited in movement of the eyeball from the reference eyeball position to the input eyeball position is equal to or larger than a predetermined threshold value.

5. The information processing system according to claim 4, wherein the predetermined threshold value is set based on a degree of variation in eyeball position due to involuntary eye movement during fixation of the user.

6. The information processing system according to claim 4,
wherein the GUI processing means is configured to perform the processing corresponding to the second GUI element after a lapse of a predetermined time period since the recognition of the input of the direction information performed by the input recognition means,
wherein the information processing system further comprises time display means for displaying, in an area in which the second GUI element is displayed, a time remaining until the processing corresponding to the second GUI element is performed, and
wherein the predetermined threshold value is set so as to prevent the input of the direction information from being recognized based on the movement of the eyeball from the eyeball position exhibited when the user visually recognizes the second GUI element to the eyeball position exhibited when the user visually recognizes the time displayed in the area in which the second GUI element is displayed.

7. The information processing system according to claim 1, wherein the predetermined GUI elements are arrayed within three rows and three columns along at least one of a row direction or a column direction.

8. The information processing system according to claim 1, wherein the information processing system is configured to avoid recognizing both a point of gaze of the user and a GUI element at which the user is gazing.

9. An information processing method of recognizing, through use of a computer, input of direction information through eyeball movement of a user and performing processing corresponding to a predetermined GUI element, the information processing method comprising:
an input recognition step of setting a previously acquired eyeball position of the user as a reference eyeball position serving as a reference, setting an eyeball position of the user acquired after the acquisition of the reference eyeball position as an input eyeball position, and recognizing the input of the direction information based on a moving direction of an eyeball from the reference eyeball position to the input eyeball position;
a GUI processing step of performing, based on the recognized input of the direction information, processing corresponding to a second GUI element, which is adjacent to a first GUI element currently in a selected state, and is present in a direction the input of which has been received; and a reference update step of dynamically and repeatedly updating the reference eyeball position based on the acquired eyeball position of the user, wherein the processing corresponding to the predetermined GUI element comprises transition from the selected state of the first GUI element to a selected state of the second GUI element, and wherein the information processing method is configured to confirm, when a predetermined time has elapsed since turning of the second GUI element to the selected state, the selection of the second GUI element when no transition from the selected state of the second GUI element to a selected state of another GUI element occurs.

10. A non-transitory medium including a information processing program for causing a computer to recognize input of direction information through eyeball movement of a user and execute processing corresponding to a predetermined GUI element, the information processing program for causing the computer to execute:

input recognition processing for setting a previously acquired eyeball position of the user as a reference eyeball position serving as a reference, setting an eyeball position of the user acquired after the acquisition of the reference eyeball position as an input eyeball position, and recognizing the input of the direction information based on a moving direction of an eyeball from the reference eyeball position to the input eyeball position;

GUI processing for performing, based on the recognized input of the direction information, processing corresponding to a second GUI element, which is adjacent to a first GUI element currently in a selected state, and is present in a direction the input of which has been received; and reference update processing for dynamically and repeatedly updating the reference eyeball position based on the acquired eyeball position of the user, wherein the processing corresponding to the predetermined GUI element comprises transition from the selected state of the first GUI element to a selected state of the second GUI element, and wherein the information processing program is configured to confirm, when a predetermined time has elapsed since turning of the second GUI element to the selected state, the selection of the second GUI element when no transition from the selected state of the second GUI element to a selected state of another GUI element occurs.

* * * * *